(12) United States Patent
Johnson et al.

(10) Patent No.: US 11,919,585 B2
(45) Date of Patent: Mar. 5, 2024

(54) TRACK TENSION CONTROL

(71) Applicant: DEERE & COMPANY, Moline, IL (US)

(72) Inventors: Bruce S. Johnson, Waterloo, IA (US); Dennis A. Bowman, Denver, IA (US); Benjamin J. Heimbuch, Cedar Falls, IA (US); Daniel J. Garvin, Cedar Falls, IA (US); Randall K. Bill, Cedar Falls, IA (US); Jeremy P. L'Heureux, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 902 days.

(21) Appl. No.: 16/511,334

(22) Filed: Jul. 15, 2019

(65) Prior Publication Data

US 2021/0016848 A1    Jan. 21, 2021

(51) Int. Cl.
*B62D 55/30*    (2006.01)

(52) U.S. Cl.
CPC .................................. *B62D 55/305* (2013.01)

(58) Field of Classification Search
CPC .... B62D 55/305; B62D 55/30; B62D 55/112; B62D 55/116
USPC .................................................. 305/145, 144
See application file for complete search history.

(56) References Cited

U.S. PATENT DOCUMENTS

| | | | | |
|---|---|---|---|---|
| 2,561,901 A | * | 7/1951 | Bachman | B62D 55/305 267/221 |
| 3,972,569 A | * | 8/1976 | Bricknell | B62D 55/30 305/144 |
| 3,994,352 A | * | 11/1976 | Siorek | B62D 55/116 188/110 |

(Continued)

FOREIGN PATENT DOCUMENTS

| | | | | |
|---|---|---|---|---|
| CN | 103264732 A | | 8/2013 | |
| CN | 110217303 A | * | 9/2019 | ........... B62D 55/065 |

(Continued)

OTHER PUBLICATIONS

German Search Report issued in counterpart application No. 102020207348.1 dated Mar. 3, 2021 (10 pages).

*Primary Examiner* — S. Joseph Morano
*Assistant Examiner* — Eva L Comino
(74) *Attorney, Agent, or Firm* — Taft Stettinius & Hollister LLP; Stephen F. Rost

(57) ABSTRACT

A track tension system including a hydraulic cylinder coupled between a drive frame and idler of a track system, an accumulator and a hydraulic valve that controls flow between the cylinder and accumulator. The cylinder extends and retracts to change the distance between the drive frame and idler which increases and decreases, respectively, tension on the track system. The hydraulic valve can be opened to allow flow between the cylinder and accumulator, and closed to block flow between the cylinder and accumulator. Control factors can be monitored to control valve position. An overload pressure relief can allow flow between the (Continued)

cylinder and accumulator when the hydraulic valve is closed and pressure in the cylinder reaches overload pressure. An orifice can allow constricted flow between the cylinder and accumulator when the hydraulic valve is closed. A check valve can connect the track tension system to a vehicle hydraulic system.

18 Claims, 5 Drawing Sheets

(56) References Cited

U.S. PATENT DOCUMENTS

| | | | | |
|---|---|---|---|---|
| 4,458,954 A * | 7/1984 | Haas | B62D 55/06 | 305/144 |
| 4,840,437 A * | 6/1989 | Henry | B62D 55/305 | 305/144 |
| 5,316,381 A * | 5/1994 | Isaacson | B62D 55/305 | 305/145 |
| 5,368,375 A * | 11/1994 | Gustafson | B62D 55/305 | 305/145 |
| 5,452,949 A * | 9/1995 | Kelderman | B62D 49/0635 | 305/129 |
| 5,482,126 A * | 1/1996 | Bouit | B62D 55/305 | 180/9.1 |
| 5,984,436 A | 11/1999 | Hall | | |
| 5,997,109 A * | 12/1999 | Kautsch | B62D 55/305 | 305/128 |
| 6,336,690 B2 * | 1/2002 | Toms | B62D 55/30 | 305/144 |
| 6,431,665 B1 * | 8/2002 | Banerjee | B62D 55/30 | 180/9.1 |
| 9,302,666 B2 * | 4/2016 | Rindfleisc | B60W 30/184 | |
| 9,303,692 B2 * | 4/2016 | Lubben | F16H 57/043 | |
| 9,694,861 B2 * | 7/2017 | Thomas | E02F 9/2025 | |
| 9,989,976 B2 * | 6/2018 | Garvin | B62D 55/32 | |
| 10,077,087 B2 * | 9/2018 | Lubben | B62D 55/084 | |
| 10,214,256 B2 * | 2/2019 | Rehberg | B62D 55/125 | |
| 10,457,097 B2 * | 10/2019 | Lubben | B60K 17/046 | |
| 11,173,971 B2 * | 11/2021 | Kautsch | B62D 55/12 | |
| 2003/0117017 A1 * | 6/2003 | Hoff | B62D 55/30 | 305/143 |
| 2004/0119336 A1 * | 6/2004 | Lussier | B62D 55/305 | 305/145 |
| 2006/0108870 A1 * | 5/2006 | Livesay | B62D 55/305 | 305/148 |
| 2007/0182246 A1 * | 8/2007 | Bodin | B62D 55/305 | 305/143 |
| 2009/0072617 A1 * | 3/2009 | Alfthan | B62D 55/305 | 305/146 |
| 2009/0102282 A1 * | 4/2009 | Weiser | B62D 55/14 | 305/165 |
| 2009/0200862 A1 * | 8/2009 | Matthys | B62D 55/305 | 180/9.1 |
| 2009/0278403 A1 * | 11/2009 | Canossa | B62D 55/14 | 305/116 |
| 2011/0309673 A1 * | 12/2011 | Vigren | B62D 55/32 | 305/145 |
| 2014/0125118 A1 * | 5/2014 | Nagorcka | B62D 55/104 | 305/132 |
| 2014/0265549 A1 * | 9/2014 | Anderfaas | B62D 55/305 | 305/145 |
| 2014/0284996 A1 * | 9/2014 | Necib | B62D 55/305 | 305/145 |
| 2015/0175226 A1 | 6/2015 | Johnson et al. | | |
| 2017/0129557 A1 * | 5/2017 | Gustafson | B62D 55/104 | |
| 2018/0086397 A1 * | 3/2018 | Sauvageau | F16F 9/3292 | |
| 2018/0118286 A1 * | 5/2018 | Sauvageau | B60G 17/0165 | |
| 2018/0118287 A1 | 5/2018 | Sauvageau et al. | | |
| 2018/0118291 A1 * | 5/2018 | Sauvageau | B62D 55/305 | |
| 2018/0170464 A1 * | 6/2018 | De Brouwer | B62D 55/244 | |
| 2018/0338413 A1 * | 11/2018 | Connell | A01B 63/008 | |
| 2020/0114992 A1 * | 4/2020 | Edelin | B62D 55/305 | |
| 2020/0262498 A1 * | 8/2020 | Bender | B62D 25/188 | |
| 2021/0016848 A1 * | 1/2021 | Johnson | B62D 55/305 | |
| 2021/0094636 A1 * | 4/2021 | Forster | F16F 9/068 | |
| 2021/0214026 A1 * | 7/2021 | Bhosale | B62D 55/065 | |
| 2021/0362791 A1 * | 11/2021 | West | B62D 55/065 | |
| 2021/0362792 A1 * | 11/2021 | Rehberg | B62D 55/30 | |
| 2022/0105998 A1 * | 4/2022 | Poulin | B62D 55/116 | |

FOREIGN PATENT DOCUMENTS

| | | | | |
|---|---|---|---|---|
| CN | 111661182 A | * | 9/2020 | |
| CN | 112550503 A | * | 3/2021 | ......... B62D 55/305 |
| DE | 1158379 B | * | 11/1963 | |
| DE | 2358386 A1 | | 6/1975 | |
| DE | 102021204021 A1 | * | 11/2021 | ......... B62D 55/065 |
| DE | 102021204022 A1 | * | 11/2021 | ............ B62D 55/12 |
| EP | 2574526 A2 | * | 4/2013 | ............ B62D 55/10 |
| GB | 2393696 A | * | 4/2004 | ......... B62D 55/305 |
| SU | 1652173 A1 | * | 5/1991 | |
| WO | 2016049760 A1 | | 4/2016 | |
| WO | WO-2021108928 A1 | * | 6/2021 | |

* cited by examiner

TRACK TENSION CONTROL

FIELD OF THE DISCLOSURE

The present disclosure relates to machinery with a track drive, and more particularly to control of track tension in track drive systems.

BACKGROUND

Track systems are used on many agricultural, construction, forestry and other types of vehicles. Track tension is typically controlled in one of two ways: fixed and passive. Fixed is when set screws are adjusted to set a track tension and the track tension is not adjusted during usage. Passive is typically accomplished with springs or hydraulic cylinders and accumulators to mechanically apply track tension. With passive track tension systems, the system pressure can be set in a service scenario with an external hydraulic line. Alternatively, track tension can be permanently plumbed to the hydraulic system, so each time rated hydraulic pressure is achieved a check valve opens to make sure peak track tension is maintained.

There are advantages and disadvantages to higher track tension. Advantages include higher rim pull capability on the drive wheel, which allows for more power transmission from the drivetrain to the track belt. One example of a high power requirement is a braking event. Disadvantages include high inherent forces that the design needs to overcome, more parasitic power losses, and reduced component life. High track tension loads put a significant load on the wheel hub bearings which necessitates the use of large wheel hub bearings to get adequate bearing life. The high track tension is required for peak rim pull situations. The track tension keeps the track on the drivewheel. Panic brake conditions create the most severe peak rim pull condition.

The track tension can be applied with a hydraulic cylinder and an accumulator. The accumulator provides enough oil volume for compliance in the system when material is ingested between the track and the idlers/midrollers. Without an accumulator the lower oil volume would result in a stiffer tension cylinder. During a brake event the peak rim pull loads will cause the cylinder to compress and the track will wind up. In some cases this can allow the track to skip a lug on the drivewheel. A stiffer cylinder would result in less track wind up and the track would not skip lugs on the drivewheel as easily.

It would be desirable to control track tension in a way that allows a lower nominal track tension to be used in typical operations and lower design loads, but that can increase track tension when high load scenarios are encountered and transmit the required power for that scenario.

SUMMARY

A track tension system is disclosed for a vehicle with a track system that includes a drive frame, first and second idlers and a track that moves about the first and second idlers. The track tension system includes a hydraulic cylinder, an accumulator and a hydraulic valve. The hydraulic cylinder is mechanically coupled between the drive frame and the first idler. The hydraulic valve is configured to control hydraulic flow between the hydraulic cylinder and the accumulator. The hydraulic cylinder is configured to extend and retract to change the distance between the drive frame and the first idler which increases and decreases, respectively, tension on the track of the track system. The hydraulic valve can move between an open position and a closed position, where in the open position the hydraulic valve allows hydraulic fluid to flow freely in both directions between the hydraulic cylinder and the accumulator: and in the closed position the hydraulic valve blocks hydraulic fluid flow between the hydraulic cylinder and the accumulator.

The track tension system can also include a controller that monitors one or more control factors, and controls the position of the hydraulic valve based on the monitored control factors. The controller can monitor brake system pressure and control the position of the hydraulic valve based on the monitored brake system pressure; where the controller commands the hydraulic valve to the closed position when the brake system pressure exceeds a first brake pressure threshold, and commands the hydraulic valve to the open position when the brake system pressure goes back below a second brake pressure threshold. The controller can monitor vehicle ground speed and control the position of the hydraulic valve based on the monitored vehicle ground speed; where the controller commands the hydraulic valve to the closed position when the vehicle ground speed exceeds a first speed threshold, and commands the hydraulic valve to the open position when the vehicle ground speed goes back below a second speed threshold. The controller can monitor vehicle acceleration and deceleration and control the position of the hydraulic valve based on the monitored vehicle acceleration and deceleration; where the controller commands the hydraulic valve to the closed position when the rate of vehicle acceleration or deceleration exceeds a first acceleration change threshold, and commands the hydraulic valve to the open position when the vehicle acceleration or deceleration goes back below a second acceleration change threshold. The controller can monitor brake pedal position and control the position of the hydraulic valve based on the monitored brake pedal position; where the controller commands the hydraulic valve to the closed position when the brake pedal position goes below a first brake pedal threshold, and commands the hydraulic valve to the open position when the brake pedal position goes above a second brake pedal threshold.

The track tension system can also include an overload pressure relief configured to allow hydraulic fluid to flow between the hydraulic cylinder and the accumulator when the hydraulic valve is in the closed position and pressure in the hydraulic cylinder equals or exceeds an overload pressure. The track tension system can also include an orifice configured to allow constricted hydraulic flow between the hydraulic cylinder and the accumulator when the hydraulic valve is in the closed position. The vehicle can include a vehicle hydraulic system; and the track tension system can also include a check valve that connects the track tension system to the vehicle hydraulic system, where the check valve allows adjustment of nominal hydraulic pressure in the track tension system. The accumulator can have a hydraulic volume and a nitrogen volume.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
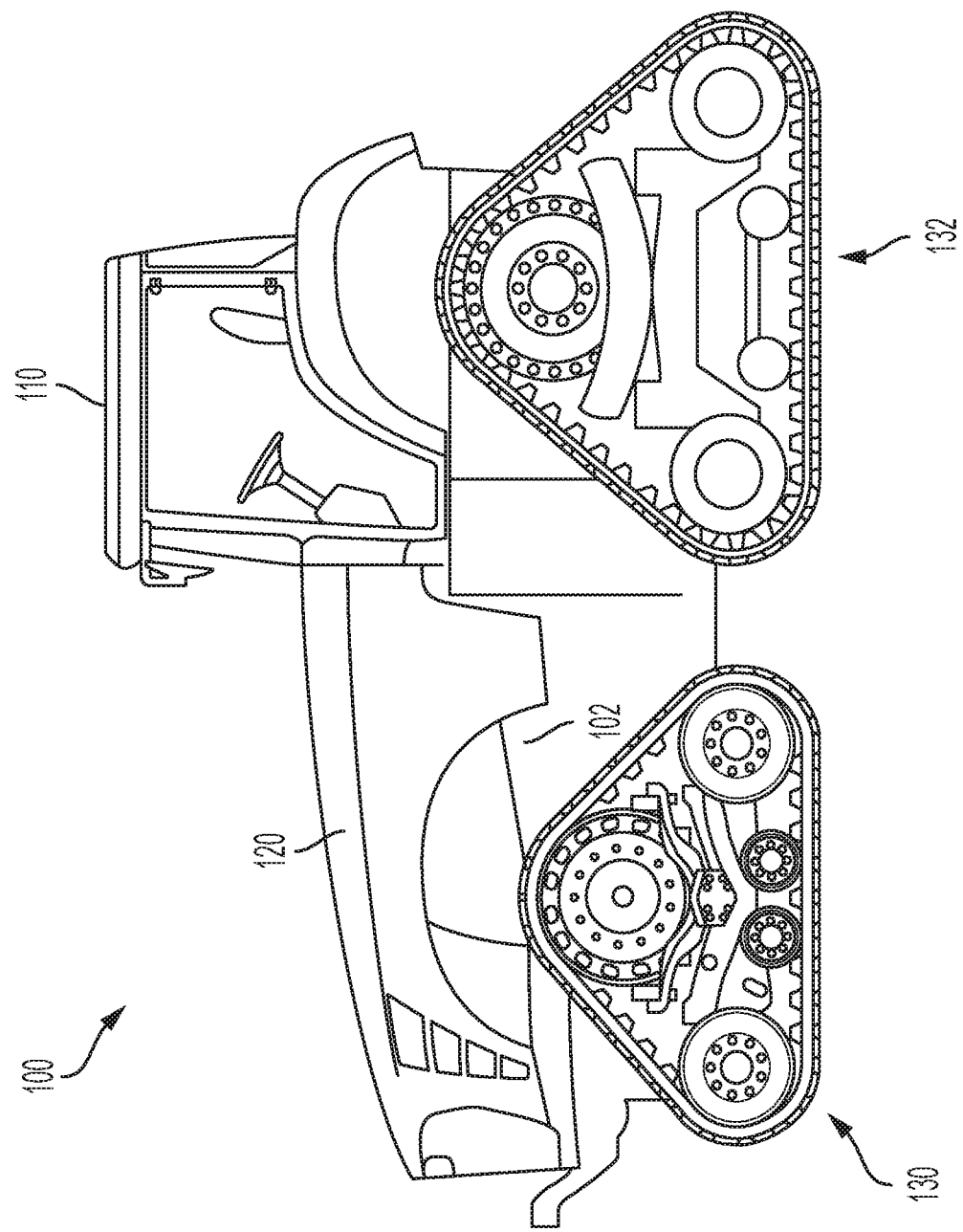
FIG. 1 illustrates an exemplary vehicle with track drives.

FIG. 1 illustrates an exemplary track drive vehicle 100, in this example a tractor, including a tractor frame 102, an operator cab 110, an engine compartment that holds an engine 120, front track drive assemblies 130 and rear track drive assemblies 132. FIG. 1 only shows the left side of the vehicle 100 with one front track drive assembly 130 and one rear track drive assembly 132; the right side of the vehicle 100 also includes one front track drive assembly 130 and one rear track drive assembly 132. The tractor frame 102 supports the operator cab 110 and engine 120. The front and rear track drive assemblies 130, 132 support the tractor frame 102 above the ground, and provide propelling force to the vehicle 100. At least the front track drive assemblies 130 can be steerable to steer the vehicle 100, and alternatively both the front and rear track drive assemblies 130, 132 can be steerable to steer the vehicle 100. The operator cab 110 provides the operator with a clear view of the area being worked by the vehicle 100. The operator cab 110 includes controls for the operator to control the engine 120 and the track drive assemblies 130, 132.

Figure 2:
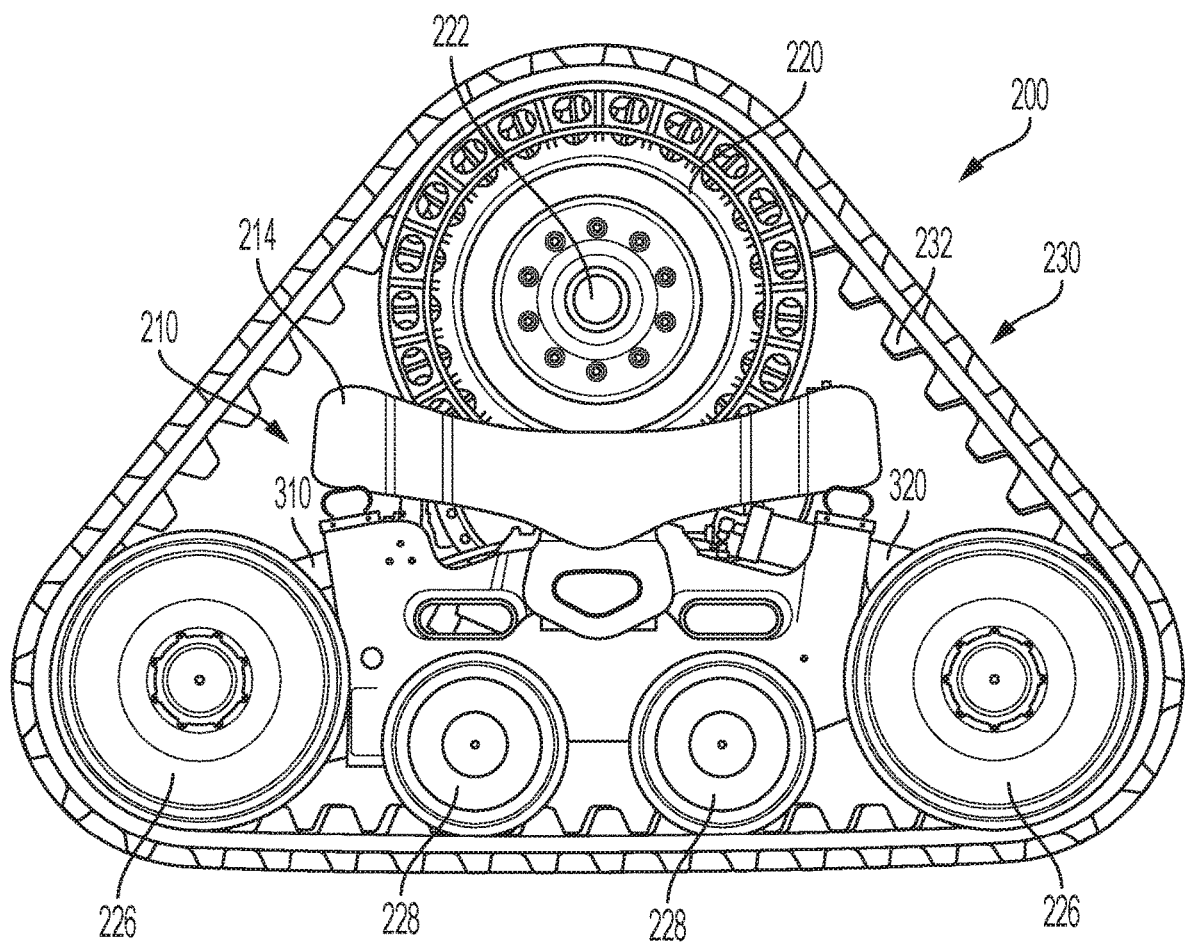
FIG. 2 illustrates an outside view of an exemplary track drive assembly with an exemplary track tension system.
Figure 3:
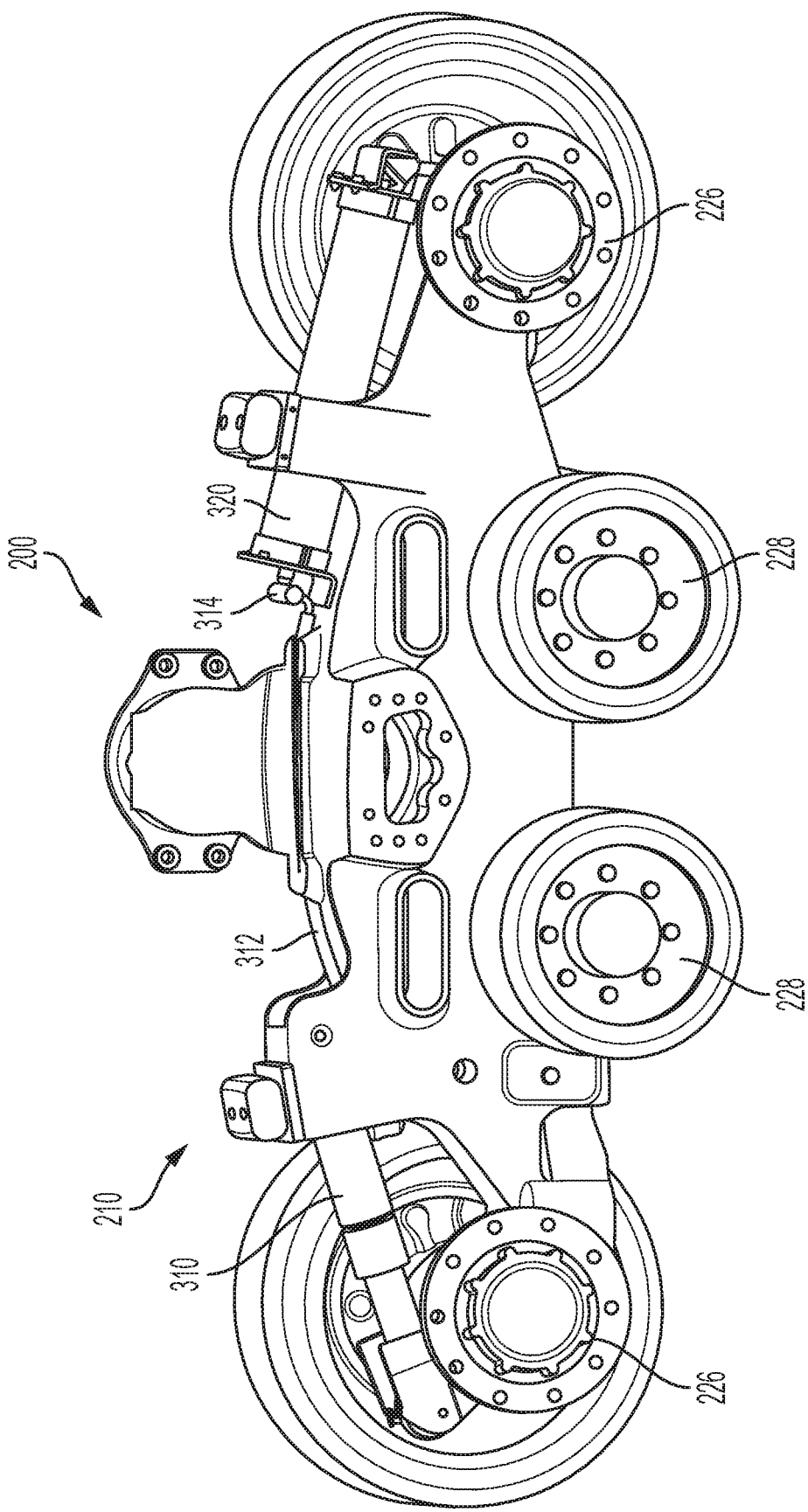
FIG. 3 illustrates an inside view of an exemplary track drive assembly.

FIG. 2 illustrates an outside view of an exemplary track drive assembly 200, and FIG. 3 illustrates an inside view of the exemplary track drive assembly 200 with the track and other components removed for clarity. The track drive assembly 200 includes a drive frame 210, a knuckle 214, a drive wheel 220, idlers 226, mid rollers 228, and track 230 with track lugs 232. Power from the engine 120 of the vehicle 100 drives a driveshaft which extends through the knuckle 214 and is coupled to a hub 222. The hub 222 can be mechanically coupled to the driveshaft using a gear set and can be mechanically coupled to the knuckle 214 using a bearing set. The drive frame 210 is connected to the knuckle 214. The idlers 226 and mid rollers 228 are connected to the drive frame 210. The track 230 moves about the drive wheel 220, idlers 226 and mid rollers 228. The knuckle 214 and drive frame 210 support the components of the track drive assembly 200. The drive wheel 220 is coupled to the hub 222 and rotates with the hub 222. The drive wheel 220 drives the track 230 clockwise or counterclockwise around the drive wheel 220, idlers 226 and mid rollers 228 to propel the vehicle 100.

FIGS. 2 and 3 also illustrates an exemplary track tension system that includes a hydraulic cylinder 310 and an accumulator 320 coupled by hydraulic lines 312 and valves 314 as described below. The hydraulic cylinder 310 has a first end attached to the drive frame 210 and a second end attached to the idler 226. The accumulator 320 is attached to the drive frame 210. The track tension system can extend and retract the hydraulic cylinder 310 to control tension on the track 230. When the track tension system extends the hydraulic cylinder 310, the idler 226 is moved further relative to the drive frame 210 which increases the tension on the track 230. When the track tension system retracts the hydraulic cylinder 310, the idler 226 is moved closer relative to the drive frame 210 which decreases the tension on the track 230. The accumulator 320 helps accommodate for tension variations due to material ingestion between the track 230 and the rollers 220, 226, 228. Not having an accumulator 320 would help with panic brake conditions. An electric/hydraulic valve 314 can separate the cylinder 310 and the accumulator 320 such that the valve 314 is open during normal operating conditions, and is closed during peak rim pull conditions.

Figure 4:
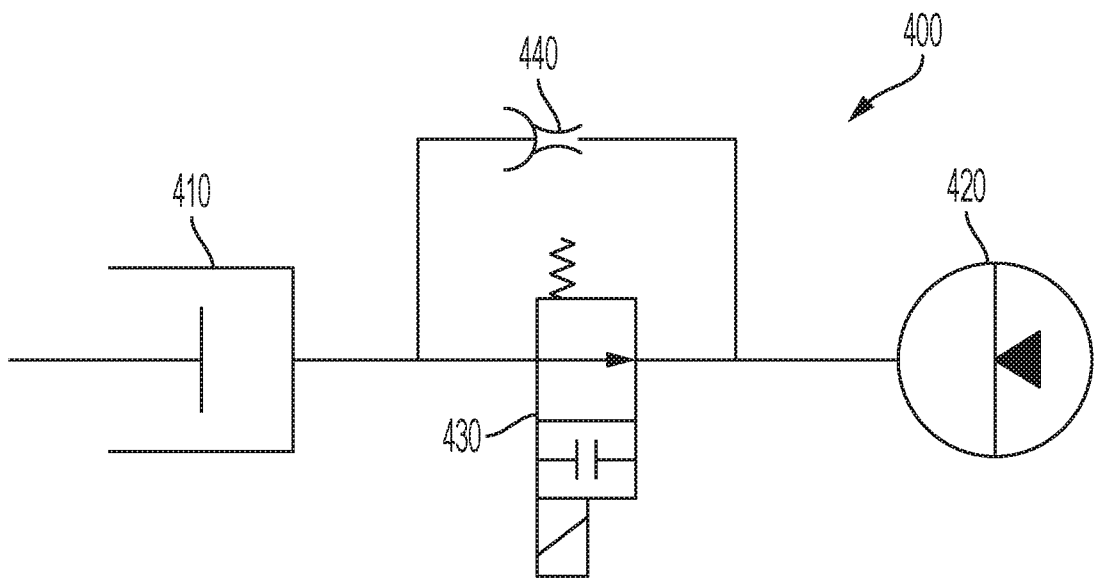
FIG. 4 illustrates an exemplary track tension system hydraulic circuit that includes a hydraulic cylinder, an accumulator, a hydraulic valve and an overload pressure relief.

FIG. 4 illustrates an exemplary hydraulic circuit 400 for a track tension system that includes a hydraulic cylinder 410, an accumulator 420 a hydraulic valve 430 and an overload pressure relief 440. The hydraulic valve 430 can be an on/off hydraulic valve or other type of hydraulic valve that provides the necessary functionality. The hydraulic valve 430 is biased in the open position shown in FIG. 4 which allows hydraulic fluid to flow freely in both directions between the hydraulic cylinder 410 and the accumulator 420. Peak rim pull conditions typically occur during a panic brake condition at high speeds on the road, where there is less risk of material ingestion between the track and the rollers. So during a brake event, the valve 430 can be moved to the closed position which blocks the flow of hydraulic fluid between the hydraulic cylinder 410 and the accumulator 420. When the valve 430 is in the closed position, the hydraulic cylinder 410 and the track tension system are stiffer which helps keep the track lugs 232 engaged with the drivewheel 220.

A benefit of this solution is that the compliance level required for a braking event is not needed for normal operating conditions. So the nominal track tension could potentially be reduced. If the track system has a lower nominal track tension, smaller wheel hub bearings could be used for the vehicle axle, which allows smaller housings and shafts, which could potentially have an impact on both weight and cost of the vehicle. A risk of this solution is the stiffer system, when the valve 430 is closed, could cause an overload condition that could be detrimental to the track undercarriage. The overload pressure relief 440 can be built into or around the valve 430 to prevent an overload condition and potential structural damage and system failure.

Figure 5:
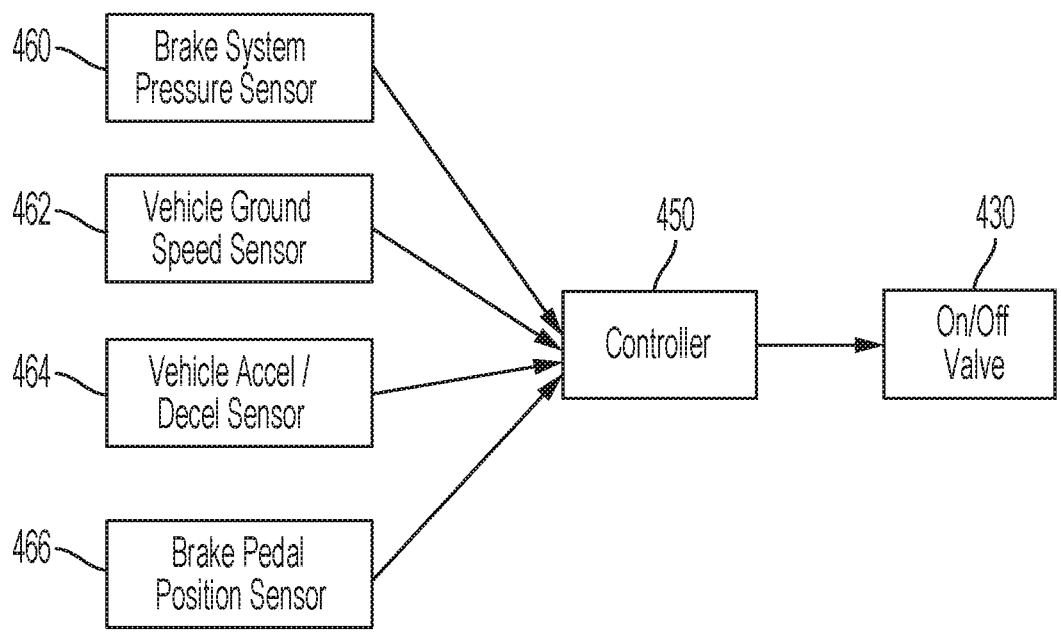
FIG. 5 illustrates exemplary sensors that can monitor control factors sent to a track tension system controller to control the position of the hydraulic valve in the track tension system.

One or more control factors can be monitored and used to signal when the hydraulic valve 430 is moved between the open and closed positions. FIG. 5 illustrates some sensors 460-466 that can monitor control factors and send signals to a track tension system controller 450 which send signals to the hydraulic valve 430 to control its position. A brake system pressure sensor 460 can monitor the vehicle brake system pressure as a control factor; and the controller 450 can close the hydraulic valve 430 when the brake system pressure exceeds a first brake pressure threshold, and reopen the hydraulic valve 430 when the brake system pressure goes back below a second lower brake pressure threshold. Various other control factors could also be used alone or in combination to signal when the hydraulic valve 430 is moved between the open and closed positions. A vehicle ground speed sensor 462 can monitor the vehicle ground speed as a control factor; and the controller 450 can close the hydraulic valve 430 when the vehicle ground speed exceeds a first speed threshold, and reopen the hydraulic valve 430 when the vehicle ground speed goes back below a second lower speed threshold. A vehicle acceleration/deceleration sensor 464 can monitor the vehicle acceleration and deceleration as a control factor, and the controller 450 can close the hydraulic valve 430 when the rate of vehicle acceleration or deceleration exceeds a first acceleration change threshold, and reopen the hydraulic valve 430 when the rate of vehicle acceleration or deceleration goes back below a second lower acceleration change threshold. A brake pedal position sensor 466 can monitor brake pedal position as a control factor; and the controller 450 can close the hydraulic valve 430 when the brake pedal position passes a first brake pedal threshold, and reopen the hydraulic valve 430 when the brake pedal position goes back above a second brake pedal position threshold. When the brake pedal is depressed an electronic switch could first be triggered before actual force transmission to the brakes, where the electronic switch would close the valve 430 and effectively remove the accumulator 420 from the track tension system 400 which will maintain high track tension and not allow displacement. The control logic could also utilize the Mechanical Front Wheel Drive (MFWD) control logic, where the MFWD is actuated during braking events along with a few other scenarios.

The accumulator 420 can have a hydraulic volume along with a nitrogen volume, where the nitrogen volume can provide the compliance for the system. The valve 430 isolates the hydraulic volumes in each of the hydraulic cylinder 410 and the accumulator 420 when the valve 430 is closed, which makes the cylinder 410 infinitely stiff because it cuts off the nitrogen compliance from the cylinder 410.

Figure 6:
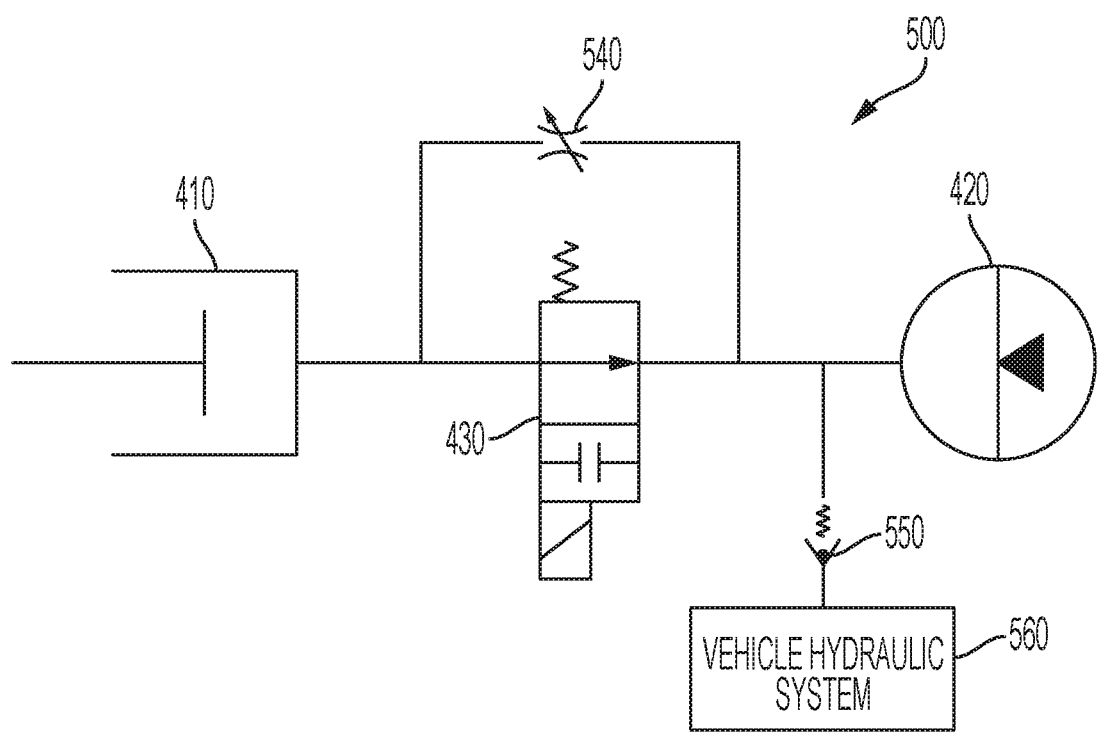
FIG. 6 illustrates an exemplary track tension system hydraulic circuit that includes a hydraulic cylinder, an accumulator, a hydraulic valve, an orifice and an optional connection to the vehicle hydraulic system.

FIG. 6 illustrates an alternative track tension system 500 that includes the hydraulic cylinder 410, the accumulator 420 and the electrohydraulic valve 430 with an orifice 540 in place of the overload pressure relief 440. The orifice 540 allows constricted flow between the cylinder 410 and the accumulator 420 even when the electrohydraulic valve 430 is closed. This still increases the stiffness of the track tensioning system. For high rim pull conditions this embodiment reduces the compliance and keeps the track lugs 232 engaged with the drivewheel 220. The orifice 540 can be adjustable to enable the track tension when the valve 430 is closed (in high rim pull conditions) to be increased or decreased depending on the allowed flow through the orifice 540. FIG. 6 also illustrates an optional check valve 550 that connects the track tension system 500 to the vehicle hydraulic system 560. This optional connection through the check valve 550 allows adjustment of the nominal hydraulic pressure in the track tension system 500.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A track tension system for a vehicle with a track system that includes a drive frame, first and second idlers and a track that moves about the first and second idlers, the track tension system comprising:
a hydraulic cylinder mechanically coupled between the drive frame and the first idler;
an accumulator;
a hydraulic valve positioned between the hydraulic cylinder and the accumulator, the hydraulic valve having an open position and a closed position, the hydraulic valve configured to control hydraulic flow between the hydraulic cylinder and the accumulator;
a controller that monitors brake system pressure and controls the position of the hydraulic valve based on the monitored brake system pressure;
an orifice positioned in a continuously open flow path between the accumulator and the hydraulic cylinder, the orifice being configured to allow constricted hydraulic flow between the hydraulic cylinder and the accumulator independent of the hydraulic valve being in either of the open position and the closed position;
wherein the hydraulic cylinder is configured to extend and retract to change the distance between the drive frame and the first idler which increases and decreases, respectively, tension on the track of the track system;
wherein the controller commands the hydraulic valve to move to the closed position when the brake system pressure exceeds a first brake pressure threshold, and commands the hydraulic valve to move to the open position when the brake system pressure goes back below a second brake pressure threshold.

2. The track tension system of claim 1, wherein in the open position the hydraulic valve allows hydraulic fluid to flow freely in both directions between the hydraulic cylinder and the accumulator: and in the closed position the hydraulic valve blocks hydraulic fluid flow between the hydraulic cylinder and the accumulator.

3. The track tension system of claim 2, wherein the vehicle further includes a vehicle hydraulic system; and the track tension system further comprises a check valve that connects the track tension system to the vehicle hydraulic system, wherein the check valve allows adjustment of nominal hydraulic pressure in the track tension system.

4. The track tension system of claim 2, wherein the accumulator has a hydraulic volume and a nitrogen volume.

5. The track tension system of claim 1, wherein the controller monitors a plurality of control factors and controls the position of the hydraulic valve based on the monitored control factors.

6. The track tension system of claim 1, wherein the controller further monitors vehicle ground speed and controls the position of the hydraulic valve based on the monitored vehicle ground speed;
wherein the controller commands the hydraulic valve to the closed position when the vehicle ground speed exceeds a first speed threshold, and commands the hydraulic valve to the open position when the vehicle ground speed goes back below a second speed threshold.

7. The track tension system of claim 1, wherein the controller further monitors vehicle acceleration and deceleration and controls the position of the hydraulic valve based on the monitored vehicle acceleration and deceleration;

wherein the controller commands the hydraulic valve to the closed position when the rate of vehicle acceleration or deceleration exceeds a first acceleration change threshold, and commands the hydraulic valve to the open position when the vehicle acceleration or deceleration goes back below a second acceleration change threshold.

8. The track tension system of claim 1, wherein the controller further monitors brake pedal position and controls the position of the hydraulic valve based on the monitored brake pedal position;
wherein the controller commands the hydraulic valve to the closed position when the brake pedal position goes below a first brake pedal threshold, and commands the hydraulic valve to the open position when the brake pedal position goes above a second brake pedal threshold.

9. The track tension system of claim 1, further comprising an overload pressure relief configured to allow hydraulic fluid to flow between the hydraulic cylinder and the accumulator when the hydraulic valve is in the closed position and pressure in the hydraulic cylinder equals or exceeds an overload pressure.

10. The track tension system of claim 1, wherein the orifice is adjustable to vary an amount of hydraulic flow through the orifice.

11. A track tension system for a vehicle with a track system that includes a drive frame, first and second idlers and a track that moves about the first and second idlers, the track tension system comprising:
a hydraulic cylinder mechanically coupled between the drive frame and the first idler;
an accumulator;
a hydraulic valve configured to control hydraulic flow between the hydraulic cylinder and the accumulator, wherein the hydraulic valve is configured to move between an open position which allows hydraulic fluid to flow freely through the hydraulic valve in both directions between the hydraulic cylinder and the accumulator, and a closed position which blocks hydraulic fluid flow through the hydraulic valve between the hydraulic cylinder and the accumulator;
a controller that monitors brake system pressure and controls the position of the hydraulic valve based on the monitored brake system pressure; and
an orifice positioned in a continuously open flow path between the accumulator and the hydraulic cylinder, the orifice configured to allow constricted hydraulic flow between the hydraulic cylinder and the accumulator independent of the hydraulic valve being in either of the open position and the closed position;
wherein the hydraulic cylinder is configured to extend and retract to change the distance between the drive frame and the first idler which increases and decreases, respectively, tension on the track of the track system; and
wherein the controller commands the hydraulic valve to the closed position when the brake system pressure exceeds a first brake pressure threshold, and commands the hydraulic valve to the open position when the brake system pressure goes back below a second brake pressure threshold.

12. The track tension system of claim 11, wherein the controller further monitors a plurality of control factors and controls the position of the hydraulic valve based on the monitored control factors.

13. The track tension system of claim 11, wherein the controller further monitors vehicle ground speed and controls the position of the hydraulic valve based on the monitored vehicle ground speed;
wherein the controller commands the hydraulic valve to the closed position when the vehicle ground speed exceeds a first speed threshold, and commands the hydraulic valve to the open position when the vehicle ground speed goes back below a second speed threshold.

14. The track tension system of claim 11, wherein the controller further monitors vehicle acceleration and deceleration and controls the position of the hydraulic valve based on the monitored vehicle acceleration and deceleration;
wherein the controller commands the hydraulic valve to the closed position when the rate of vehicle acceleration or deceleration exceeds a first acceleration change threshold, and commands the hydraulic valve to the open position when the vehicle acceleration or deceleration goes back below a second acceleration change threshold.

15. The track tension system of claim 11, wherein the controller further monitors brake pedal position and controls the position of the hydraulic valve based on the monitored brake pedal position;
wherein the controller commands the hydraulic valve to the closed position when the brake pedal position goes below a first brake pedal threshold, and commands the hydraulic valve to the open position when the brake pedal position goes above a second brake pedal threshold.

16. A track tension system for a vehicle with a track system that includes a drive frame, first and second idlers and a track that moves about the first and second idlers, the track tension system comprising:
a hydraulic cylinder mechanically coupled between the drive frame and the first idler;
an accumulator;
a hydraulic valve configured to control hydraulic flow between the hydraulic cylinder and the accumulator, wherein the hydraulic valve is configured to move between an open position which allows hydraulic fluid to flow freely through the hydraulic valve in both directions between the hydraulic cylinder and the accumulator, and a closed position which blocks hydraulic fluid flow through the hydraulic valve between the hydraulic cylinder and the accumulator; and
an orifice positioned in a continuously open flow path between the accumulator and the hydraulic cylinder, the orifice configured to allow constricted hydraulic flow between the hydraulic cylinder and the accumulator when the hydraulic valve is in either of open position and the closed position, the orifice being adjustable to vary an amount of hydraulic flow through the orifice;
wherein the hydraulic cylinder is configured to extend and retract to change the distance between the drive frame and the first idler which increases and decreases, respectively, tension on the track of the track system.

17. The track tension system of claim 16, further comprising a controller that monitors a plurality of control factors and controls the position of the hydraulic valve based on the monitored control factors.

18. The track tension system of claim 16, wherein the vehicle further includes a vehicle hydraulic system; and the track tension system further comprises a check valve that connects the track tension system to the vehicle hydraulic system, wherein the check valve allows adjustment of nominal hydraulic pressure in the track tension system.

\* \* \* \* \*